United States Patent
Aoyama et al.

(10) Patent No.: US 10,852,430 B2
(45) Date of Patent: Dec. 1, 2020

(54) OBJECT DETECTION DEVICE

(71) Applicant: DENSO CORPORATION, Kariya (JP)

(72) Inventors: Tetsuya Aoyama, Kariya (JP); Yu Koyama, Kariya (JP); Dai Kondo, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/659,820

(22) Filed: Oct. 22, 2019

(65) Prior Publication Data
US 2020/0049818 A1    Feb. 13, 2020

Related U.S. Application Data

(63) Continuation of application No. PCT/JP2018/016177, filed on Apr. 19, 2018.

(30) Foreign Application Priority Data

Apr. 24, 2017 (JP) ................ 2017-085496

(51) Int. Cl.
| | | |
|---|---|---|
| B60Q 1/00 | (2006.01) |
| G01S 15/931 | (2020.01) |
| G01S 7/52 | (2006.01) |
| G01S 7/521 | (2006.01) |
| G01S 7/526 | (2006.01) |

(Continued)

(52) U.S. Cl.
CPC ........... *G01S 15/931* (2013.01); *G01S 7/521* (2013.01); *G01S 7/52004* (2013.01); *G01S 7/526* (2013.01); *G01S 7/56* (2013.01); *G01S 15/87* (2013.01)

(58) Field of Classification Search
CPC .......... G01S 15/931; G01S 7/52; G01S 7/524; G01S 7/526; G01S 15/93
See application file for complete search history.

(56) References Cited

U.S. PATENT DOCUMENTS

| | | | | |
|---|---|---|---|---|
| 5,754,123 A | * | 5/1998 | Nashif | .................... G01S 15/86 340/903 |
| 6,580,385 B1 | * | 6/2003 | Winner | .................. G01S 13/865 342/70 |

(Continued)

FOREIGN PATENT DOCUMENTS

JP          2013-104689 A         5/2013

*Primary Examiner* — Toan N Pham
(74) *Attorney, Agent, or Firm* — Maschoff Brennan (57) ABSTRACT

An object detection device includes: a transceiver section that transmits an ultrasonic wave and receives an ultrasonic wave including a reflected wave of the transmitted ultrasonic wave, and outputs a signal in accordance with a wavelength of the received ultrasonic wave; a frequency control section that changes a frequency of the ultrasonic wave transmitted by the transceiver section to a plurality of frequencies different from a driving frequency used to detect the distance from the object; and a fault determination section that determines whether a fault occurs in the function of detecting the distance from the object due to a value of an environment temperature or a wavelength of the ultrasonic wave transmitted by the transceiver section, based on a value of the signal outputted from the transceiver section when the transceiver section transmits the ultrasonic wave at a selected one of the frequencies different from the driving frequency.

9 Claims, 6 Drawing Sheets

(51) Int. Cl.
G01S 7/56 (2006.01)
G01S 15/87 (2006.01)

(56) References Cited

U.S. PATENT DOCUMENTS

7,554,484 B2 * 6/2009 Zimmermann ......... G01S 13/87
            342/70
10,654,473 B2 * 5/2020 Kim ...................... B60W 50/14

* cited by examiner

OBJECT DETECTION DEVICE

CROSS-REFERENCE TO RELATED APPLICATION

The present application is a continuation application of International Application No. PCT/JP2018/016177, filed Apr. 19, 2018, which claims priority to Japanese Patent Application No. 2017-85496, filed Apr. 24, 2017. The contents of these applications are incorporated herein by reference in their entirety.

BACKGROUND

Technical Field

The present disclosure relates to an object detection device.

Background Art

An ultrasonic sensor sends a probe wave, which is an ultrasonic wave, externally from the vehicle and receives a reception wave including a reflected wave of the probe wave and transmits a signal in accordance with the reception wave to the ECU.

SUMMARY

One aspect of the present disclosure is an object detection device provided with a function of detecting a distance from an object, the device including: a transceiver section that transmits an ultrasonic wave and receives an ultrasonic wave including a reflected wave of the transmitted ultrasonic wave, and outputs a signal in accordance with a wavelength of the received ultrasonic wave; a frequency control section that changes a frequency of the ultrasonic wave transmitted by the transceiver section to a plurality of frequencies different from a driving frequency used to detect the distance from the object; and a fault determination section that determines whether a fault occurs in the function of detecting the distance from the object due to a value of an environment temperature or a wavelength of the ultrasonic wave transmitted by the transceiver section, based on a value of the signal outputted from the transceiver section when the transceiver section transmits the ultrasonic wave at a selected one of the frequencies different from the driving frequency.

DETAILED DESCRIPTION OF THE PREFERRED EMBODIMENTS

Conventionally, object detection devices provided with ultrasonic sensors and electronic control units (ECUs) are used for vehicles. Such an ultrasonic sensor sends a probe wave, which is an ultrasonic wave, externally from the vehicle and receives a reception wave including a reflected wave of the probe wave and transmits a signal in accordance with the reception wave to the ECU. The ECU then senses the approach of an obstacle from an output signal of the ultrasonic sensor to notify a driver and control brakes.

To prevent false notifications and malfunctions in such an object detection device, it is assumed that an object detection device must to be provided with a function to detect faults occurring in itself.

For example, PTL 1 proposes a method of determining whether a fault occurs in an ultrasonic sensor based on whether, when driving an oscillator at one frequency different from the resonance frequency of the oscillator, a wave receiving signal is detected within a detection gate time.

[PTL 1] JP 2013-104689 A

Examples of a cause of a fault in the object detection device include a bubble in a microphone configuring the ultrasonic sensor. Such a bubble in the microphone may cause amplification of the sound pressure of the ultrasonic waves propagating inside the microphone due to resonance and may result in a change in reverberation characteristics.

Such resonance occurs, for example, in the case that the diameter of the bubble coincides with the half wavelength of the ultrasonic wave. The wavelength of the ultrasonic wave is determined by the frequency of the ultrasonic wave and the temperature of the environment. Accordingly, even if a bubble is produced in the microphone, resonance occurs only at a specific temperature as long as the ultrasonic wave has a constant wavelength. When the frequency of the ultrasonic wave to detect a fault is defined as one specific frequency as described in PTL 1, resonance often does not occur even when a bubble is present in the microphone, resulting in low detectability of faults.

In view of the above problems, it is an object of the present disclosure to provide an object detection device with high detectability of faults.

According to the configuration of the present disclosure, the frequency control section changes the frequency of the ultrasonic wave transmitted by the transceiver section to a plurality of frequencies different from the frequency of the ultrasonic wave used to detect the distance from the object. Accordingly, the detectability of faults is high compared with the case where the frequency of the ultrasonic wave used to detect a fault is limited to one specific value.

Embodiments of the present disclosure are described below with reference to the drawings. In the respective embodiments below, parts identical or equivalent to each other are described with identical signs.

(First Embodiment)

Figure 1:
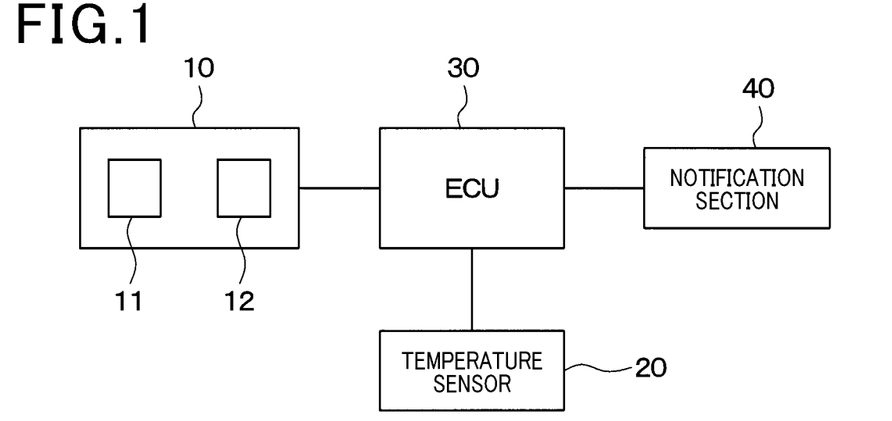
FIG. 1 is a diagram illustrating the general configuration of an object detection device according to a first embodiment.

The first embodiment is described. An object detection device in the present embodiment is an ultrasonic sonar device and is provided with a function of detecting the presence of an object around a vehicle, a distance from the object, and the like. As illustrated in FIG. 1, the object detection device includes an ultrasonic sensor 10, a temperature sensor 20, an ECU 30, and a notification section 40.

The ultrasonic sensor 10 is arranged facing an outer surface of the vehicle and is configured to send a probe wave, which is an ultrasonic wave, toward the outside of the vehicle and receive a reception wave including a reflected wave of the probe wave, to output a signal in accordance with a waveform of the reception wave. The ultrasonic sensor 10 is equivalent to a transceiver section.

Figure 2:
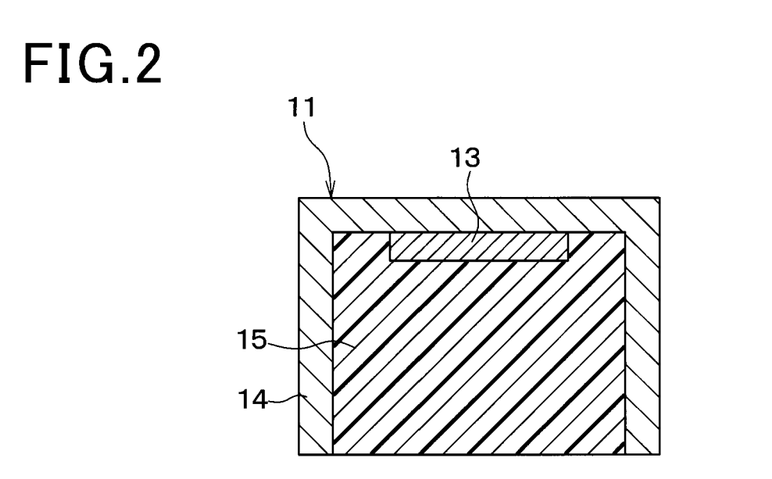
FIG. 2 is a cross-sectional view of a microphone in FIG. 1.

As illustrated in FIG. 1, the ultrasonic sensor 10 includes a microphone 11 and a control section 12. As illustrated in FIG. 2, the microphone 11 is provided with a piezoelectric element 13, a case 14 made of aluminum, and a silicon resin 15.

The case 14 is configured with a cylindrical frame. The piezoelectric element 13 is arranged inside the case 14, and the piezoelectric element 13 is adhered to an axial end of the case 14. A space inside the case 14 is filled with the silicone resin 15, and the piezoelectric element 13 is covered with the silicone resin 15.

Wiring, not shown, is formed inside the case 14, and via the wiring, the piezoelectric element 13 is connected to the control section 12. An alternating voltage is applied from the control section 12 to two electrodes provided in the piezoelectric element 13, causing deformation of a piezoelectric film and transmission of ultrasonic waves. The control section 12 receives a potential difference caused between the two electrodes when the piezoelectric film is deformed due to the received ultrasonic waves.

The control section 12 is connected to the piezoelectric element 13 and the ECU 30 and changes the frequency of the alternating voltage to be applied to the piezoelectric element 13 based on a signal from the ECU 30. The control section 12 sends a signal, to the ECU 30, in accordance with the potential difference between the two electrodes provided in the piezoelectric element 13. Specifically, in the control section 12, a band pass filter (BPF), not shown, is arranged to pass a signal in a predetermined frequency band and interrupt signals in other frequency bands different from the predetermined frequency band. The BPF has a center frequency varying in accordance with a driving frequency $f_d$ described later. The signal outputted by the piezoelectric element 13 is processed by the BPF provided in the control section 12 and then is inputted to the ECU 30. In the present embodiment, as described later, the driving frequency $f_d$ is assumed to be 60 kHz and the center frequency of the BPF is assumed to be 60 kHz, i.e. the same as the driving frequency $f_d$.

The temperature sensor 20 detects the temperature of the environment where the ultrasonic sensor 10 is placed and outputs a signal in accordance with the temperature, and is arranged near the ultrasonic sensor 10. The temperature sensor 20 is connected to the ECU 30 by a controller area network (CAN) communication bus or the like, and the ECU 30 performs a fault detection process and object detection process described later based on the signal outputted by the temperature sensor 20.

The ECU 30 is configured with a known microcomputer provided with a CPU, a ROM, a RAM, an I/O unit, and the like, and executes process, such as various arithmetic processing, in accordance with a program stored in the ROM and the like. The ROM and the RAM are non-transitory tangible storage media.

The notification section 40 notifies a driver of the presence of an object at a short distance and the like in accordance with the signal from the ECU 30. The notification section 40 is configured with, for example, a monitor, a beeper, and the like.

In the object detection device thus configured, an alternating voltage is applied from the control section 12 to the microphone 11 based on the signal transmitted from the ECU 30 to the control section 12, causing an ultrasonic wave transmitted from the microphone 11. The microphone 11 outputs a signal in accordance with the received ultrasonic wave, and the signal is transmitted via the control section 12 to the ECU 30. The ECU 30 then measures a distance from the object based on time between transmission and reception of the ultrasonic wave by the microphone 11, and based on the result of measurement, determines whether there is an object within a short distance.

Such operation is described with reference to FIG. 3. In the graphs in FIG. 3 and FIG. 5 described later, the ordinate represents the amplitude of the output signal from the microphone 11.

Figure 3:
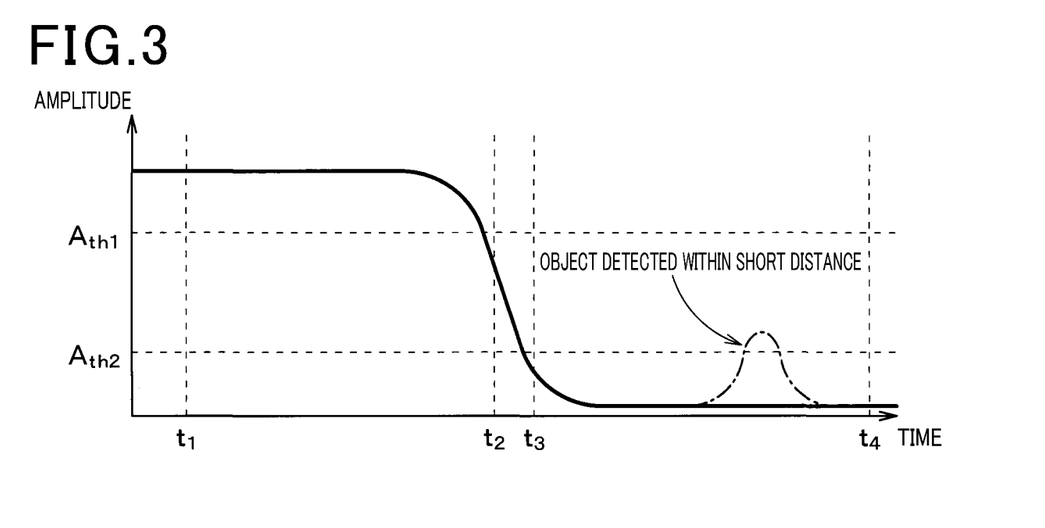
FIG. 3 is a graph illustrating output of a normal microphone.

As illustrated in FIG. 3, after the signal is transmitted from the ECU 30 to the control section 12, when the microphone 11 sends an ultrasonic wave at time point $t_1$, a state where the output signal of the microphone 11 has a large amplitude continues for a while due to reverberation, but the reverberation decreases with time and the output signal amplitude decreases.

To distinguish the output signal due to reverberation from the output signal due to the reflected wave of the ultrasonic wave reflected by the object, an object at a short distance is not detected when the value of the output signal is greater than a predetermined threshold $A_{th1}$ and until predetermined time passes after the value of the output signal becomes less than the threshold $A_{th1}$. Specifically, a time point when the value of the output signal becomes less than the threshold $A_{th1}$ is defined as $t_2$ and a time point when a certain period of time has passed after time point $t_2$ is defined as $t_3$, and an object within a short distance is not detected between time point $t_1$ and time point $t_3$.

When there is no fault in the function of detecting the distance from the object, the output signal is attenuated even after time point $t_2$ and becomes smaller than a predetermined threshold $A_{th2}$ until time point $t_3$. If there is no object within a short distance, the output signal continues to be attenuated until time point $t_4$. In contrast, if there is an object, the microphone 11 receives the ultrasonic wave reflected by the object, and as indicated by a dash dotted line in FIG. 3, a signal having an amplitude greater than the threshold $A_{th2}$ is outputted at a time point before time point $t_4$. The object within a short distance is thus detected, and the ECU 30 sends a signal indicating the presence of the object within a short distance to the notification section 40. Time point $t_4$ is defined as a time point when a certain period of time has passed after time point $t_1$, and the time between time point $t_1$ and time point $t_4$ is set in accordance with a distance to detect an object and the like.

The object detection device thus distinguishes the output signal due to the reverberation from the output signal due to the reflected wave of the ultrasonic wave reflected by the object, by providing the threshold $A_{th1}$ for the output signal and providing the time during which an object within a short distance is not to be detected.

Figure 4:
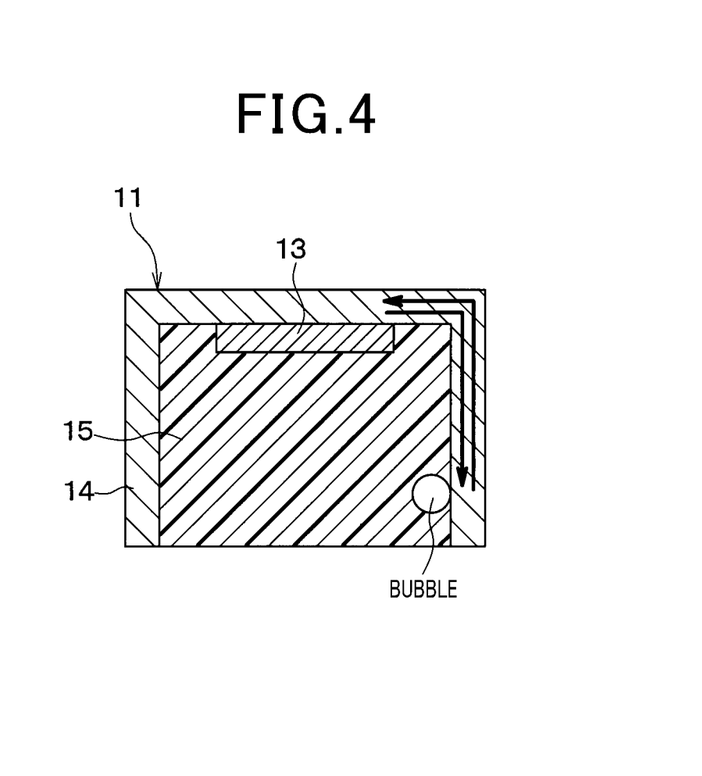
FIG. 4 is a cross-sectional view of a microphone in which a bubble is formed.

However, as illustrated in FIG. 4 for example, if a bubble is formed in the microphone 11 during the process of forming the silicon resin 15, reverberation characteristics may be changed due to resonance and a fault sometimes occurs in the function of detecting the distance from the object.

Specifically, as indicated by arrows in FIG. 4, when the ultrasonic wave transmitted from the piezoelectric element 13 reaches a bubble through the case 14, resonance occurs in the case where, for example, the diameter of the bubble coincides with the half wavelength of the ultrasonic wave, and the sound pressure of the ultrasonic wave is greatly amplified. The ultrasonic wave with the amplified sound pressure then returns to the piezoelectric element 13 through the case 14, causing a large deformation of the piezoelectric element 13.

Figure 5:
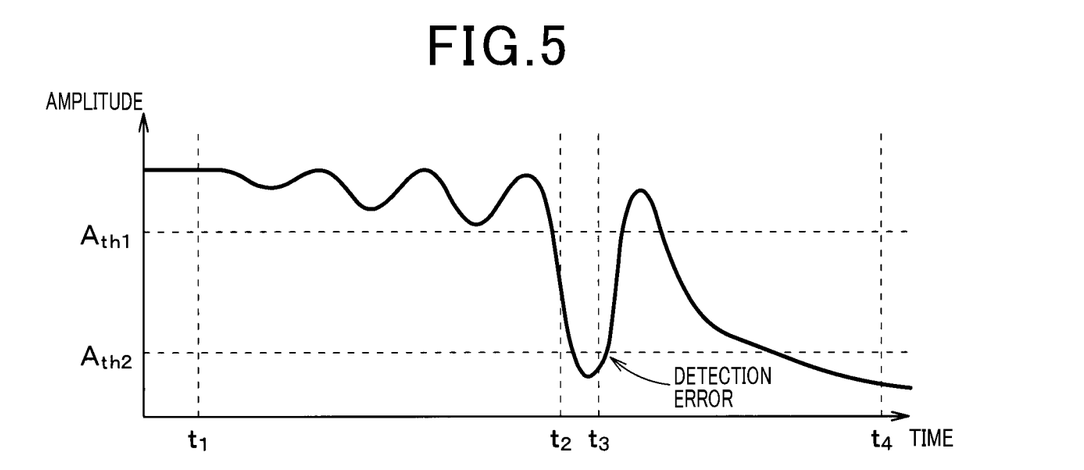
FIG. 5 is a graph illustrating output of the microphone in which a bubble is formed.

As illustrated in FIG. 5, the output signal due to such deformation of the piezoelectric element 13 repeats large increases and decreases of the amplitude. Accordingly, even after the state where the value of the output signal becomes less than the threshold $A_{th1}$ continues for a predetermined period of time and passes time point $t_3$, the output signal sometimes becomes greater again and there is a risk of causing a detection error.

To avoid a false notification due to such a fault, the ECU 30 performs a fault detection process to detect the wavelength of the ultrasonic wave when the fault occurs. In the object detection process to transmit a signal in accordance with the distance from the object to the notification section 40, the ECU 30 then stops transmitting of the signal to the notification section 40 when determining that the wavelength of the ultrasonic wave transmitted by the microphone 11 coincides with the wavelength of the ultrasonic wave in the occurrence of the fault.

Such fault detection process and object detection process are described with reference to the drawings. First, the fault detection process is described referring to FIG. 6. The ECU 30 starts the fault detection process illustrated in FIG. 6 when, for example, the ignition switch of a vehicle is turned on. In addition, when the object detection process is set to be performed only while, for example, driving at less than 40 km/s, the fault detection process may be performed while driving at 40 km/s or more when the object detection process is not performed. The fault detection process illustrated in FIG. 6 may be used for inspection of the object detection device before product shipment.

Figure 6:
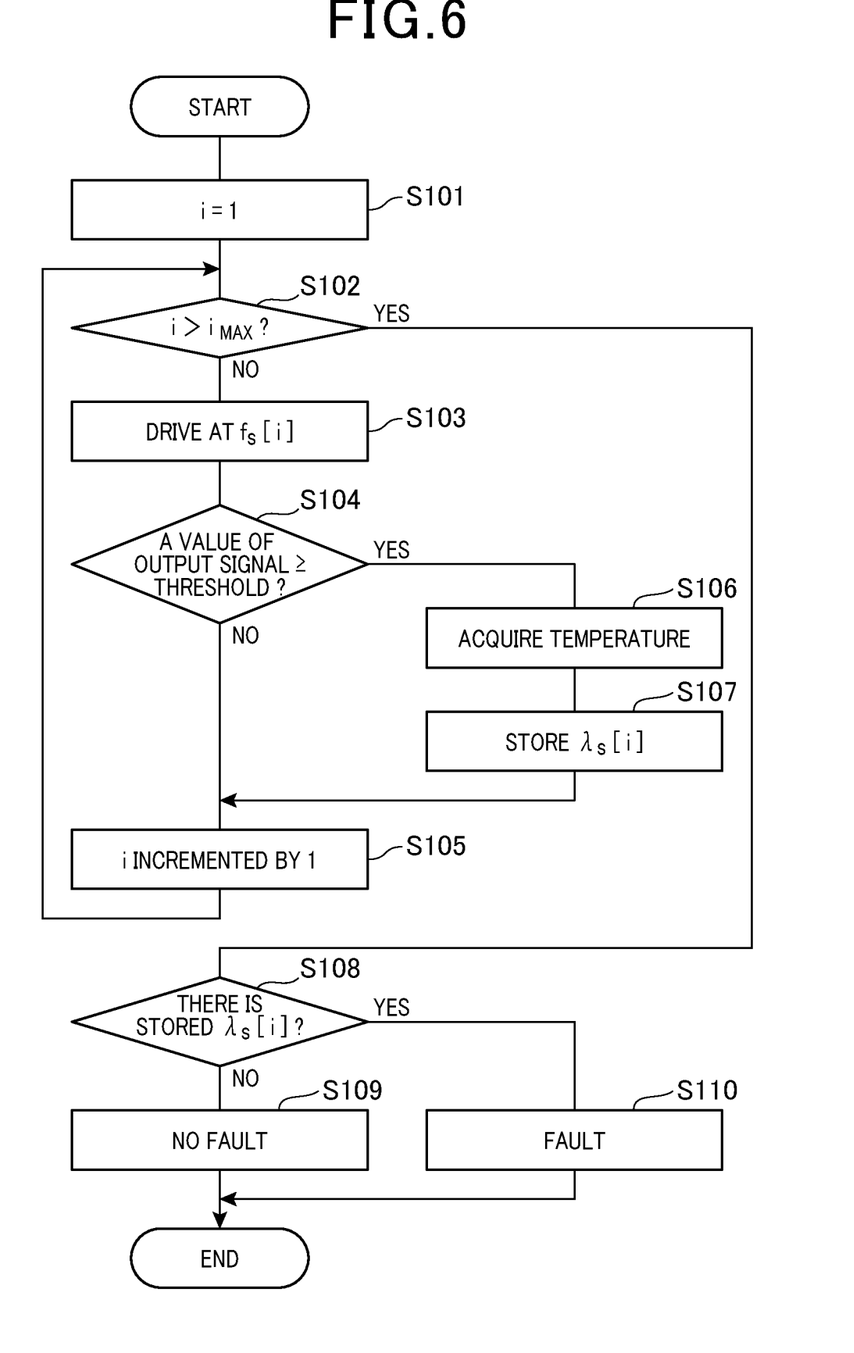
FIG. 6 is a flow chart illustrating a fault detection process in the first embodiment.

As illustrated in FIG. 6, the ECU 30 starts the fault detection process to set i=1 at step S101 and the process proceeds to step S102, and the ECU 30 determines whether i is greater than a predetermined value $i_{MAX}$ at step S102.

If the ECU 30 determines at step S102 that i is not greater than $i_{MAX}$, the process proceeds to step S103 and the ECU 30 drives the ultrasonic sensor 10 at a frequency $f_s[i]$. In other words, the ECU 30 transmits a signal to the control section 12 to apply an alternating voltage at the frequency $f_s[i]$ between the two electrodes of the piezoelectric element 13.

When the driving frequency to detect the distance from the object is defined as $f_d$, the frequency $f_s[i]$ of the ultrasonic wave transmitted by the ultrasonic sensor 10 at step S103 is within a predetermined frequency range including the driving frequency $f_d$ and is defined as a frequency different from the driving frequency $f_d$. In addition, $i_{MAX}$ is defined as an integer of 2 or more. In the predetermined frequency range including the driving frequency $f_d$, the ECU 30 changes the frequency of the ultrasonic wave transmitted by the ultrasonic sensor 10 to a plurality of frequencies different from the driving frequency $f_d$.

In the present embodiment, considering the range of wavelength changes due to the temperature, the range of changing the frequency of the ultrasonic wave transmitted by the ultrasonic sensor 10 is defined as ½ time or more and 3 times or less the driving frequency $f_d$, and the frequency $f_s[i]$ is defined to increase with an increase in i. Specifically, the range of the frequency $f_s[i]$ is defined as 30 kHz or more and 180 kHz or less. Alternatively, the frequency $f_s[i]$ may be defined to decrease with an increase in i. The ECU 30 functions as a frequency control section by executing steps S102 and S103.

The ECU 30 calculates a wavelength $\lambda_s[i]$ based on an environment temperature T and the value of an output signal of the ultrasonic sensor 10 when the ultrasonic sensor 10 receives a reflected wave of an ultrasonic wave transmitted by the ultrasonic sensor 10 at the frequency $f_s[i]$. The wavelength $\lambda_s[i]$ is the wavelength of an ultrasonic wave when a fault occurs in the function of detecting the distance from the object.

Specifically, on the step proceeds from step S103 to step S104 and the ECU 30 acquires the output signal of the ultrasonic sensor 10. The ECU 30 then determines whether the value of the output signal is a value in a predetermined range, and if the value of the output signal is a value out of the predetermined range, determines that a fault occurs in the function of detecting the distance from the object based on the environment temperature or the wavelength of the ultrasonic wave transmitted by the ultrasonic sensor 10. The ECU 30 functions as a fault determination section by executing step S104.

In this step, the ECU 30 determines whether the value of the output signal of the microphone 11 becomes a predetermined threshold or more after a predetermined period of time has passed from application of an alternating voltage to the piezoelectric element 13, and if the value of the output signal is a predetermined threshold or more, determines that a fault occurs in the function of detecting the distance from the object. As the threshold, for example, a threshold to distinguish the output signal due to the reverberation from the output signal due to the reflected wave of the ultrasonic wave reflected by the object, in other words, the threshold $A_{th1}$ illustrated in FIGS. 3 and 5 may be used. The threshold may vary with the frequency $f_s[i]$.

If the ECU 30 determines that the value of the output signal of the ultrasonic sensor 10 is not the predetermined threshold or more at step S104, the process proceeds to step S105 and i is incremented by 1, and then the process returns to step S102.

Meanwhile, if the ECU 30 determines that the value of the output signal of the ultrasonic sensor 10 is the predetermined threshold or more at step S104, the process proceeds to step S106 and the environment temperature T is acquired based on the signal from the temperature sensor 20 and then the process proceeds to step S107.

At step S107, the ECU 30 calculates a wavelength $\lambda_s[i]$ (m) based on the frequency $f_s[i]$ (Hz) and the environment temperature T (° C.) acquired at step S106. Specifically, where the velocity of sound is defined as v(m/s), $\lambda_s[i]=v/f_s[i]$ and v=0.6T+331.5 and thus $\lambda_s[i]=(0.6T+331.5)/f_s[i]$. Then, the fault occurring in the function of detecting the distance from the object at the wavelength $\lambda_s[i]$ is stored and the process proceeds to step S105.

If it is determined that i is greater than $i_{MAX}$ at step S102, the process proceeds to step S108, and the ECU 30 determines whether there is any wavelength $\lambda_s[i]$ stored as the wavelength at which the fault occurs.

If it is determined that there is no wavelength $\lambda_s[i]$ stored as the wavelength at which the fault occurs at step S108, the process proceeds to step S109, and the ECU 30 determines that there is no fault occurred in the function of detecting the distance from the object and terminates the fault detection process.

In contrast, if it is determined that there is a wavelength $\lambda_s[i]$ stored as the wavelength at which the fault occurs at step S108, the process proceeds to step S110, and the ECU 30 determines that there is a fault occurred in the function of detecting the distance from the object and terminates the fault detection process.

Figure 7:
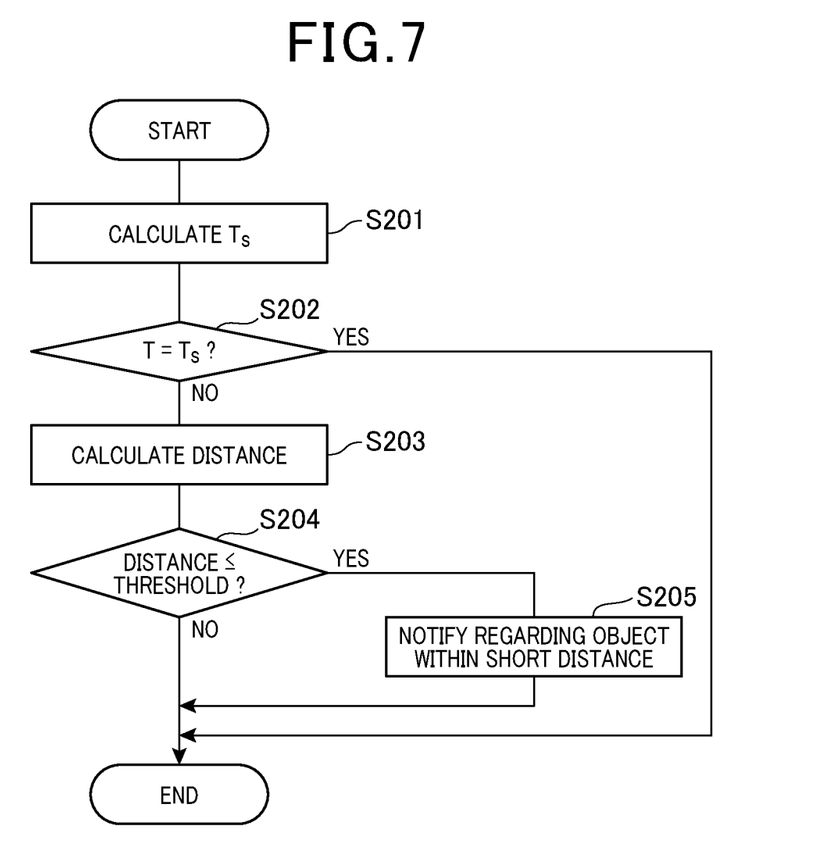
FIG. 7 is a flow chart illustrating an object detection process in the first embodiment.

Referring to FIG. 7, the object detection process will now be described. As illustrated in FIG. 7, when the ECU 30 starts the object detection process, the ECU 30 calculates a temperature $T_s[i]$ at which a fault occurs while an alternating voltage at the frequency $f_d$ is applied to the piezoelectric element 13, based on the wavelength $\lambda_s[i]$ at step S201. Specifically, on the basis of $\lambda_s[i]=(0.6T_s[i]+331.5)/f_d$, the temperature $T_s[i]$ is calculated for all $\lambda_s[i]$ stored as the wavelengths at which the fault occurs.

At step S202, the ECU 30 then acquires the environment temperature T based on the output signal of the temperature sensor 20 and determines whether any of the temperatures $T_s[i]$ calculated at step S201 coincides with the environment temperature T. If it is determined that any of the temperatures $T_s[i]$ coincides with the environment temperature T at step S202, the ECU 30 terminates the object detection process.

In contrast, if it is determined that no temperatures $T_s[i]$ coincide with the environment temperature T at step S202, in other words, no fault occurs in the function of detecting the distance from the object, the process proceeds to step S203 and the ECU 30 calculates the distance from the object.

Specifically, the ECU 30 transmits a signal to the control section 12 to cause the microphone 11 to transmit an ultrasonic wave at the frequency $f_d$ and acquires a signal based on the waveform of the ultrasonic wave received by the microphone 11 from the control section 12. The ECU 30 then calculates the distance from the object, based on the time between transmission and reception of the ultrasonic wave by the microphone 11, specifically, the time from transmitting a signal to the control section 12 until inputting the output signal of the microphone 11 by the reflected wave via the control section 12.

The process proceeds from step S203 to step S204, where the ECU 30 determines whether the distance calculated at step S203 is a predetermined threshold or less. The ECU 30 functions as a distance determination section by executing step S204.

If it is determined that the distance from the object is not the predetermined threshold or less at step S204, the ECU 30 terminates the object detection process. If it is determined that the distance from the object is the predetermined threshold or less, the process proceeds to step S205.

At step S205, the ECU 30 transmits a signal indicating that the distance from the object is the predetermined threshold or less to the notification section 40 to terminates the object detection process.

In such a manner, in the fault detection process, the ECU 30 calculates and stores the wavelength $\lambda_s[i]$ at which the fault occurs, based on the environment temperature T and the output of the microphone 11 when a reflected wave of an ultrasonic wave transmitted at the frequency $f_s[i]$ by the microphone 11 is received. In the object detection process, if there is an object within a short distance, the ECU 30 then outputs a signal indicating the presence of the object within a short distance to the notification section 40. If $T=T_s[i]$ in other words, $\lambda_d=\lambda_s[i]$, the ECU 30 stops outputting the signal indicating the presence of the object within a short distance. It should be noted that $\lambda_d$ is a wavelength of the probe wave transmitted by the microphone 11, and $\lambda_d=(0.6T+331.5)/f_d$.

In such a manner, it is possible to reduce detection errors and false notifications due to a value of the wavelength. For example, in a situation as illustrated in FIG. 5 where abnormal reverberation occurs due to a bubble and the like and the output signal of the microphone 11 has a large amplitude after time point $t_3$, it is determined made that $T=T_s[i]$ at step S202. The object detection process is then terminated without transmitting a signal indicating the presence of an object within a short distance to the notification section 40.

In the present embodiment, the frequency of the ultrasonic wave to detect a fault is further changed to a plurality of values, and thus the detectability of faults is high compared with the case that the frequency to detect a fault is limited to one specific value. In such a manner, it is possible to further reduce detection errors and false notifications for an object within a short distance.

Where the wavelength of the ultrasonic wave transmitted by the microphone 11 is defined as $\lambda$ and the diameter of the bubble is defined as d, the sound pressure of the ultrasonic wave is greatly amplified by the resonance particularly when $d=\lambda/2$. However, where m is defined as an integer of 3 or more and n is defined as a natural number, the sound pressure also has a possibility of being greatly amplified when $d=\lambda/m$ and $d=n\times\lambda$.

To cope with this situation, when $\lambda_d=\lambda_s[i]/n$ or $\lambda_d=n\times\lambda_s[i]$ in the object detection process, the notification of the presence of the object within a short distance may be stopped. In other words, the temperature $T_s[i]$ for $(0.6T_s[i]+331.5)/f_d=\lambda_s[i]/n$, $n\times\lambda_s[i]$ may be calculated at step S201 to stop the notification of the presence of the object within a short distance if the temperature $T_s[i]$ coincides with the environment temperature T.

(Second Embodiment)

The second embodiment is described. In the present embodiment, the process when the temperature $T_s[i]$ coincides with the environment temperature T in the first embodiment is changed. The rest remains same as the first embodiment and thus a description is given only of the differences from the first embodiment.

In the present embodiment, the ECU 30 changes the driving frequency $f_d$ to a value different from the original value when $T=T_s[i]$, in other words, $\lambda_d=\lambda_s[i]$.

Figure 8:
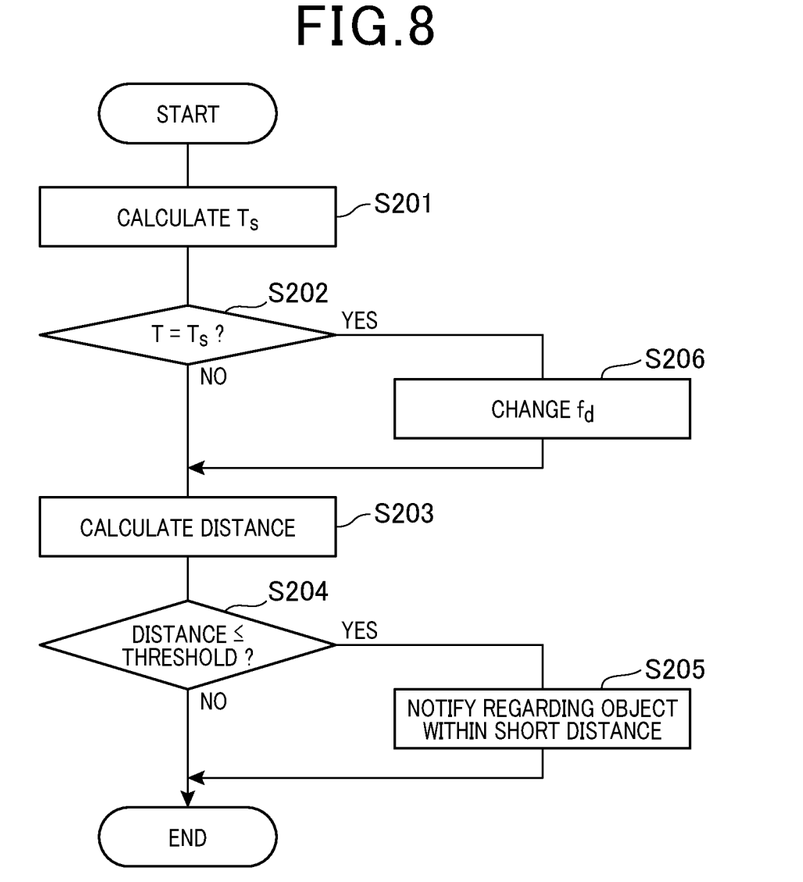
FIG. 8 is a flow chart illustrating an object detection process in a second embodiment.

Specifically, as illustrated in FIG. 8, if it is determined that $T=T_s[i]$ at step S202, the process proceeds to step S206, and the ECU 30 changes the driving frequency $f_d$ to a different value from the original value to establish $\lambda_d \neq \lambda_s[i]$. Occurrence of a fault in the function of detecting the distance from the object caused by the wavelength is thus suppressed. The process then proceeds from step S206 to step S203, and the ECU 30 transmits a signal to the notification section 40 in accordance with the distance from the object.

In the present embodiment where the driving frequency $f_d$ is changed in such a manner, it is possible to perform detection and notification of an object within a short distance even at a temperature where a fault occurs at the original driving frequency $f_d$.

When $\lambda_d=\lambda_s[i]/n$ or $\lambda_d=n\times\lambda_s[i]$, the driving frequency $f_d$ may be changed to a value different from the original value. In other words, the temperature $T_s[i]$ for $(0.6T_s[i]+331.5)/f_d=\lambda_s[i]/n$, $n\times\lambda_s[i]$ is calculated at step S202, and if the temperature $T_s[i]$ coincides with the environment temperature T, the driving frequency $f_d$ may be changed to a value different from the original value.

(Other Embodiments)

It should be noted that the present disclosure is not limited to the embodiments described above and may be changed appropriately. In each embodiment above, the components in the embodiment naturally do not have to be essential unless particularly specified as essential and obviously considered as essential from the principles. In addition, in each embodiment above, when numerical values are referred to, such as the numbers, values, amounts, and ranges of the components in the embodiment and the like, they are not limited to the specific numbers unless particularly specified as essential and obviously limited to the specific numbers in principle. Also, in each embodiment above, when the shapes, positional relationships, and the like of the components and the like are described, they are not limited to those described unless particularly specified as essential and obviously limited to the specific shapes, positional relationships, and the like in principle.

For example, in the fault detection process, the diameter d of the bubble may be calculated instead of the wavelength $\lambda_s[i]$ from the environment temperature T and the frequency $f_s[i]$, and in the object detection process the temperature $T_s[i]$ may be calculated from the diameter d and the driving frequency $f_d$.

The present disclosure may be applied to the case that a fault occurs due to a cause other than a bubble. For example, a fault due to a value of the wavelength of an ultrasonic wave sometimes occurs, in the case such as of extraneous matter being attached to the outside of the microphone 11 and the like. In such a case, application of the present disclosure allows calculation of the wavelength at which the fault occurs.

Although a single ultrasonic sensor 10 is used as a transmission and reception section in the first embodiment, a transmission section to transmit an ultrasonic wave and a reception section to receive an ultrasonic wave may be provided separately. Although the ECU 30 is used as the frequency control section, the fault determination section, and the distance determination section in the first embodiment, the frequency control section, the fault determination section, and the distance determination section may be arranged separately. The ECU 30 may be included in the ultrasonic sensor 10. The temperature sensor 20 may be included in the ultrasonic sensor 10. The control section 12 may perform some of the process performed by the ECU 30 to function as the frequency control section, the fault determination section, and/or the distance determination section.

Figure 9:
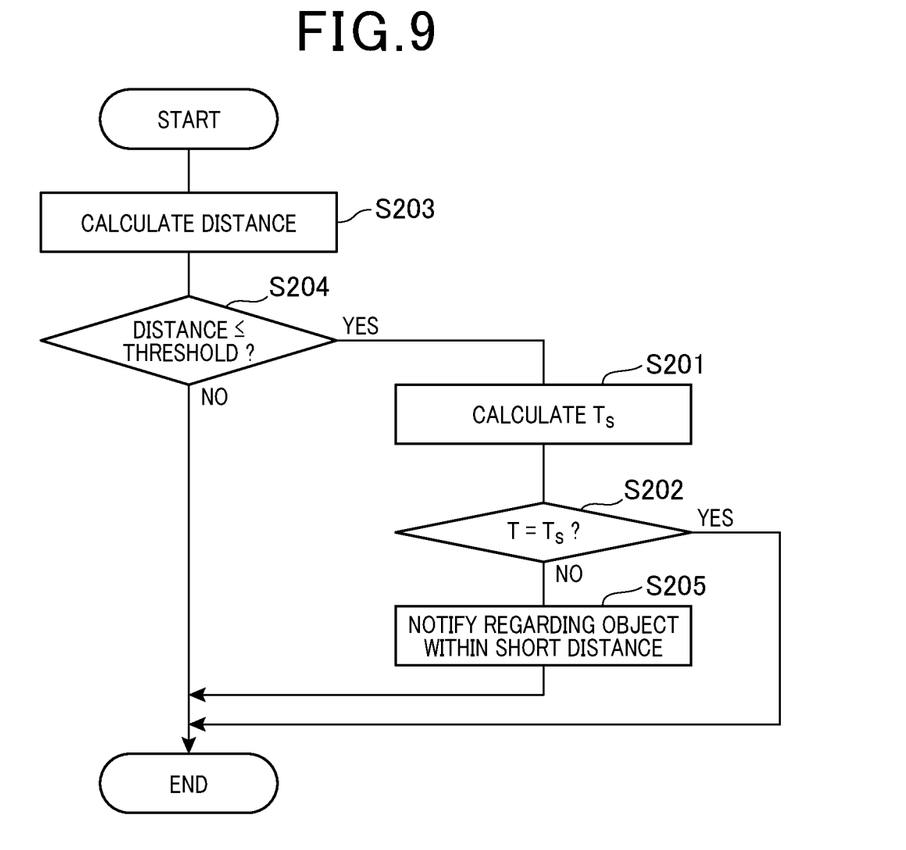
FIG. 9 is a flow chart illustrating an object detection process in another embodiment.

In the object detection process, as illustrated in FIG. 9, whether a fault occurs in the function of detecting the distance from the object may be determined only if determination is made that there is an object within a short distance. In other words, steps S203 and S204 may be performed after starting the object detection process, and steps S201 and S202 may be performed if the distance from the object is the predetermined threshold or less, and step S205 may be performed if the temperature $T_s[i]$ does not coincide with the environment temperature T and $\lambda_d \neq \lambda_s$.

What is claimed is:

1. An object detection device provided with a function of detecting a distance from an object, comprising:
    a transceiver section that transmits an ultrasonic wave and receives an ultrasonic wave including a reflected wave of the transmitted ultrasonic wave, and outputs a signal in accordance with a wavelength of the received ultrasonic wave;
    a frequency control section that changes a frequency of the ultrasonic wave transmitted by the transceiver section to a plurality of frequencies different from a driving frequency used to detect the distance from the object; and
    a fault determination section that determines whether a fault occurs in the function of detecting the distance from the object due to an environment temperature or a wavelength of the ultrasonic wave transmitted by the transceiver section, based on a value of the signal outputted from the transceiver section when the transceiver section transmits the ultrasonic wave at a selected one of the plurality of frequencies different from the driving frequency.

2. The object detection device according to claim 1, wherein the fault determination section determines that a fault occurs in the function of detecting the distance from the object if the value of the signal outputted from the transceiver section when the transceiver section transmits the ultrasonic wave at the selected one of the plurality of frequencies different from the driving frequency is located outside a predetermined range.

3. The object detection device according to claim 1, wherein the fault determination section calculates an ultrasonic-wave wavelength when a fault occurs in the function of detecting the distance from the object in accordance with:
    the environment temperature; and
    the value of the signal outputted from the transceiver section when the transceiver section transmits the ultrasonic wave at the selected one of the plurality of frequencies different from the driving frequency.

4. The object detection device according to claim 3, further comprising:
    a distance determination section that determines whether the distance from the object is a predetermined value or less based on a time from the transceiver section transmitting the ultrasonic wave until the transceiver section receiving the reflected wave of the transmitted ultrasonic wave, wherein
    the distance determination section is configured to:
        output a signal indicating that the distance from the object is the predetermined value or less, if the distance from the object is the predetermined value or less, and
        stop outputting of the signal indicating that the distance from the object is the predetermined value or less, if the following equation is established:

$$\lambda_d = \lambda_s/n \text{ or } \lambda_d = n \times \lambda_s$$

where:
    $\lambda_s$ represents the ultrasonic-wave wavelength calculated by the fault determination section;
    $\lambda_d$ represents an ultrasonic-wave wavelength obtained from the driving frequency and the environment temperature; and
    n represents a positive integer.

5. The object detection device according to claim 4, wherein the distance determination section determines whether the distance from the object is the predetermined value or less if the fault determination section determines that no fault occurs in the function of detecting the distance from the object.

6. The object detection device according to claim 4, wherein the fault determination section determines whether the fault occurs in the function of detecting the distance from the object if the distance determination section determines that the distance from the object is the predetermined value or less.

7. The object detection device according to claim 3, wherein the frequency control section changes a first value of the driving frequency to a second value different from the first value if the following equation is established:

$$\lambda_d = \lambda_s/n \text{ or } \lambda_d = n \times \lambda_s$$

where:
$\lambda_s$ represents the ultrasonic-wave wavelength calculated by the fault determination section;
$\lambda_d$ represents an ultrasonic-wave wavelength obtained from the driving frequency and the environment temperature; and
n represents a positive integer.

8. The object detection device according to claim 1, wherein the frequency control section changes the frequency of the ultrasonic wave transmitted by the transceiver section to the plurality of frequencies different from the driving frequency in a range of frequencies of ½ time or more and 3 times or less the driving frequency.

9. The object detection device according to claim 1, further comprising:
   a filter configured to pass through a part of the signal outputted by the transceiver section, so that the part of the signal is inputted to the fault determination section, the part of the signal being within a predetermined frequency band, wherein
   a center frequency of the frequency band varies with the driving frequency.

\* \* \* \* \*